F. V. BORICK.
SCREW DRIVER.
APPLICATION FILED JUNE 4, 1920.
1,422,411.
Patented July 11, 1922.
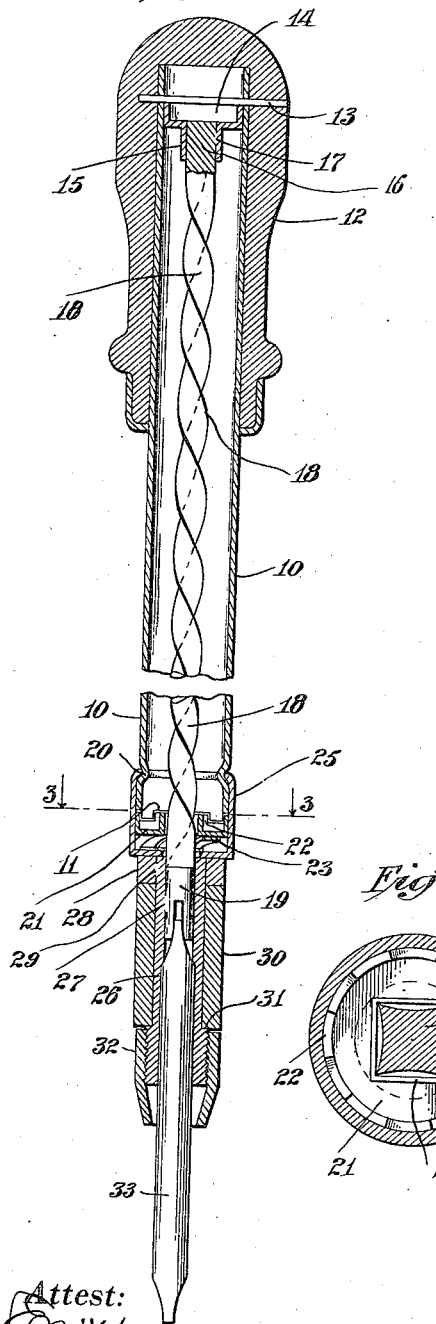
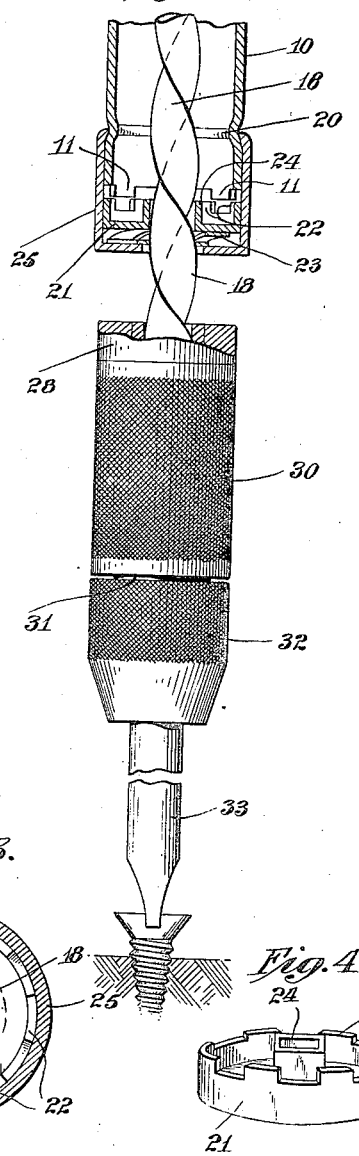
Attest:
Inventor:
FRANK V. BORICK
by
Atty ered to the tube.

UNITED STATES PATENT OFFICE.

FRANK V. BORICK, OF NEW YORK, N. Y.

SCREW DRIVER.

1,422,411.  Specification of Letters Patent.  Patented July 11, 1922.

Application filed June 4, 1920. Serial No. 386,454.

*To all whom it may concern:*

Be it known that I, FRANK V. BORICK, a citizen of the United States, residing at New York city, in the county of New York and State of New York, have invented certain new and useful Improvements in Screw Drivers, of which the following is a specification.

This invention relates to improvements in spiral tool drivers and is more particularly applicable to screw-drivers, which rotate in operation.

The principal object of the invention is to provide an efficiently operating device of this character, wherein the number of parts employed is reduced to a minimum, thereby decreasing the cost of production and the liability of derangement.

The invention consists in the structural features and combinations of parts hereinafter fully described with reference to the accompanying drawing, wherein—

Fig. 1 is a vertical sectional elevation of the improved tool driver.

Fig. 2 is an enlarged elevation, partly in section of the lower or tool holder end of the device, the handle being raised and the chuck released.

Fig. 3 is a horizontal section taken on the line 3—3 of Fig. 2, looking in the direction of the arrows; and Fig. 4 is a perspective view of the loose member of the clutch.

Referring to the drawing, the device comprises a tubular casing 10 the lower end of which is provided with clutch teeth 11 and the upper end of which is rigidly secured within a handle 12 by a pin 13 inserted therethrough. The exposed portion of the pin affords a seat against which a cup shaped member 14 contacts, said member 14 bearing against the inner wall of the tube. The member 14 has a squared central opening and is provided with a flange 15 adapted to receive the squared end 16 of a tool rod or spindle, a spot weld shown at 17 assuring a permanent connection between the two members. The cup shaped member provides a guide for the reciprocation and rotation of the tool rod. The depending portion of said tool rod is twisted to form a spiral 18, the extreme lower end of which, projecting below the tube, being round as at 19. An inwardly projecting annular bead 20 of the tubular member limits the outward travel of the rod 18, by contact of the cup member 14 with said bead. Mounted about the said rod 18, and adjacent the teeth of the tube 11, is a cup shaped clutch member 21 provided with inwardly projecting clutch teeth 22, similar in shape and number to the teeth 11. The teeth 11 and 22 are circularly arranged around the periphery of their respective parent members and are adapted to be normally held in contact by the pressure exerted by a spring 23 acting against the bottom of the member 21 which is provided with a squared central flange 24. It is to be noted that when the pressure of the spring 23 is overcome the member 21 will be free to rotate.

A cylindrical shell or ferrule 25 is placed over the end of the tubular member 10 retaining the part 21 in its relation to the tube 10 and affording a seat for the lower end of the spring 23. The upper end of the shell or ferrule member 25 engages the groove formed on the outer surface of the tube by the circular bead 20 before referred to. The engagement of the upper edge of the ferrule 25 in the groove makes it impossible for the member 25 to be slipped off.

Any suitable tool holder may be provided such as that shown in the drawing. I prefer a type wherein the shank of a chuck 26 is rigidly connected, preferably by spot welding as shown at 27, to the projecting portion 19 of the tool rod member 18. The said shank is also embraced by a spacing washer 28 welded thereto at 29 and a grip sleeve 30 loosely mounted thereon between said washer and shoulder 31 on the head of the chuck. The chuck member 26 is longitudinally split in the usual manner, and adapted to receive a knurled nut 32 closing the grip on a suitable tool 33. It will be noted that the end 19 of the tool rod is recessed or bifurcated to receive the end of a preferably double ended tool.

To operate the tool, it is necessary to pull out the tool rod 16 until the cup member 14 attached thereto, is stopped by contact with the bead 20. In doing this the tool rod will rotate freely throughout its travel of the tubular casing 10. The cup shaped clutch member 21 will remain stationary being held in engagement with the clutch teeth 11 of the tube 10 by the spring 23. Therefore, as the spiral portion of the tool rod is pulled through the member 21 a rotatory action is imparted to the tool rod. The reduced portion of the tool 33 is then placed into the slot in the head of the screw, about to be driven, and a downward pressure exerted upon the handle 12. By this action the tubular member 10 will be forced down over the tool rod, and as the cup shaped clutch member 21 is still held against rotation the tool rod will be forced to rotate by reason of its extension through the squared opening 24 on the clutch. This operation will continue until the cup guide member 14 contacts with the stop pin 13, projecting across the handle and upper end of the tube.

To continue the driving, the tool 33 is permitted to remain engaged by the slot in the head of the screw, while the handle 12 is pulled out with one hand and the loosely mounted grip sleeve 30 surrounding the chuck is held firmly to retain the reduced end of the tool 33 in engagement with the slotted head of the screw. In doing this the tool rod will remain stationary and its spiralled portion will automatically compel the clutch member 21 to move downward and away from the teeth 11 of the tubular member, disengaging the teeth 22 and 11. This operation will permit the clutch member 21 to rotate freely between the ferrule 25 and the toothed portion of the tube. The upward pulling of the handle and tube will continue until the cup guide 14 again is engaged by the bead 20. The above described several operative steps may be repeated until the driving operation is completed.

Should it be desired to operate the tool in the manner of an ordinary screw driver, i. e. without employing the spiral driving device the tool is permitted to remain closed, or in other words the tool rod will not be withdrawn from the tubular member. As the teeth 11 and 22 of the clutch member are rectangular in shape having straight vertical interengaging sides, there will be no independent rotation of either member until the cup shaped clutch member 21 is forced down away from the teeth 11 of the tube 10.

It has been found in practice that the spring 23 may be eliminated from the structure. It will be noted that the inward movement of the spiral portion of the tool rod through the clutch member 21 will compel an upward vertical movement of the latter clutch member causing the same to remain in engagement with the teeth 11 of the tubular member. This action is the reverse of that noted above, relating to the vertical disengaging of said clutch members by the rotatory action of the spiral upon the clutch member 21.

I claim:—

In a spiral tool driver, the combination of a tubular member terminating at its lower end in a series of projections provided with parallel straight side edges disposed axially thereof, a handle attached to the opposite end of said member, a spiral spindle composed of square material extensible in said tubular member, a ferrule enclosing the end of the tubular member having the said projections, the said ferrule being provided with an opening to receive the spindle therethrough and having its closed end spaced substantially away from the adjacent end of the tubular member, a complemental spring actuated member movable axially and rotatably within said ferrule and having upstanding projections similar to the first named projections and adapted to be received by the latter, whereby rotation of the tubular member in either direction will cause a corresponding rotary movement of the complemental member, the latter member being provided with an upstanding central sleeve having a through square bore to embrace the walls of said spindle, whereby axial movement of the spindle and tubular member relatively to each other will cause the projections of the complemental member to remain in engagement with the projections of the tubular member when the tool is collapsed to drive a screw and to move the complemental member axially and then rotatably to disengage the said projections when the tool is extended.

In testimony whereof I have affixed my signature.

FRANK V. BORICK.